Jan. 30, 1968  H. A. KNELL  3,366,401
TRACTOR-TRAILER HITCH

Filed March 14, 1966  3 Sheets-Sheet 1

INVENTOR.
HARVEY A. KNELL
BY
ATTORNEYS

Jan. 30, 1968  H. A. KNELL  3,366,401

TRACTOR-TRAILER HITCH

Filed March 14, 1966  3 Sheets-Sheet 2

INVENTOR.
HARVEY A. KNELL

BY
*Fryer, Ejunwold, Fix & Phillips*
ATTORNEYS

Jan. 30, 1968  H. A. KNELL  3,366,401
TRACTOR-TRAILER HITCH
Filed March 14, 1966  3 Sheets-Sheet 3

INVENTOR.
HARVEY A. KNELL
BY
ATTORNEYS

United States Patent Office 3,366,401
Patented Jan. 30, 1968

3,366,401
TRACTOR-TRAILER HITCH
Harvey A. Knell, Joliet, Ill., assignor to Caterpillar Tractor Co., Peoria, Ill., a corporation of California
Filed Mar. 14, 1966, Ser. No. 534,045
4 Claims. (Cl. 280—492)

ABSTRACT OF THE DISCLOSURE

Hitch mechanism employed between a tractor and drawn implement such as a wagon or scraper and comprising a box-like structure between a pivotal connection for the tractor and a pivotal connection for the implement formed of a combination of a casting and steel plates welded thereto in order to withstand the severe loads and stresses to which it is subjected.

---

The hitch between a tractor and an earthmoving scraper is unusually susceptible to high loading and severe shocks and is often subject to breakage in use. A scraper, in addition to carrying a load which may be in the order of 50 to 75 tons over rough terrain, is required to cut the material from the earth and force it into its own bowl.

Cutting the earth during loading, pulling the scraper over rough terrain and the power-transmission shifting impose high forces on the hitch which it carries in bending. In addition to these pull forces, steering the articulated tractor-scraper or hitting a bump with a single tractor wheel imparts a large torque to the hitch member. Hitch fatigue failure is initiated by a combination of these high pull and twisting forces being applied very often during the tractor-scraper work cycle.

Conventional hitches include a vertical pivot about which steering occurs and a horizontal pivot permitting relative lateral oscillation between the tractor and drawn implement. This arrangement lends itself to a generally triangular unit for interconnecting the pivots and the vehicular components. Heretofore a commonly used hitch has included a triangular component formed of three hollow members welded together as legs of the triangle. This configuration gave rise to many difficulties and weaknesses which resulted in failures that will presently be discussed in further detail.

It is the object of the present invention to provide an improved hitch which will carry both torsion and bending loads efficiently to avoid the weakness of previously known hitches, and to provide a hitch that is at once lighter, stronger, simpler and less costly to manufacture than other hitches. Further and more specific objects and advantages of the invention and the manner in which it is carried into practice are made apparent in the following specification wherein reference is made to the accompanying drawings.

Figure 1:
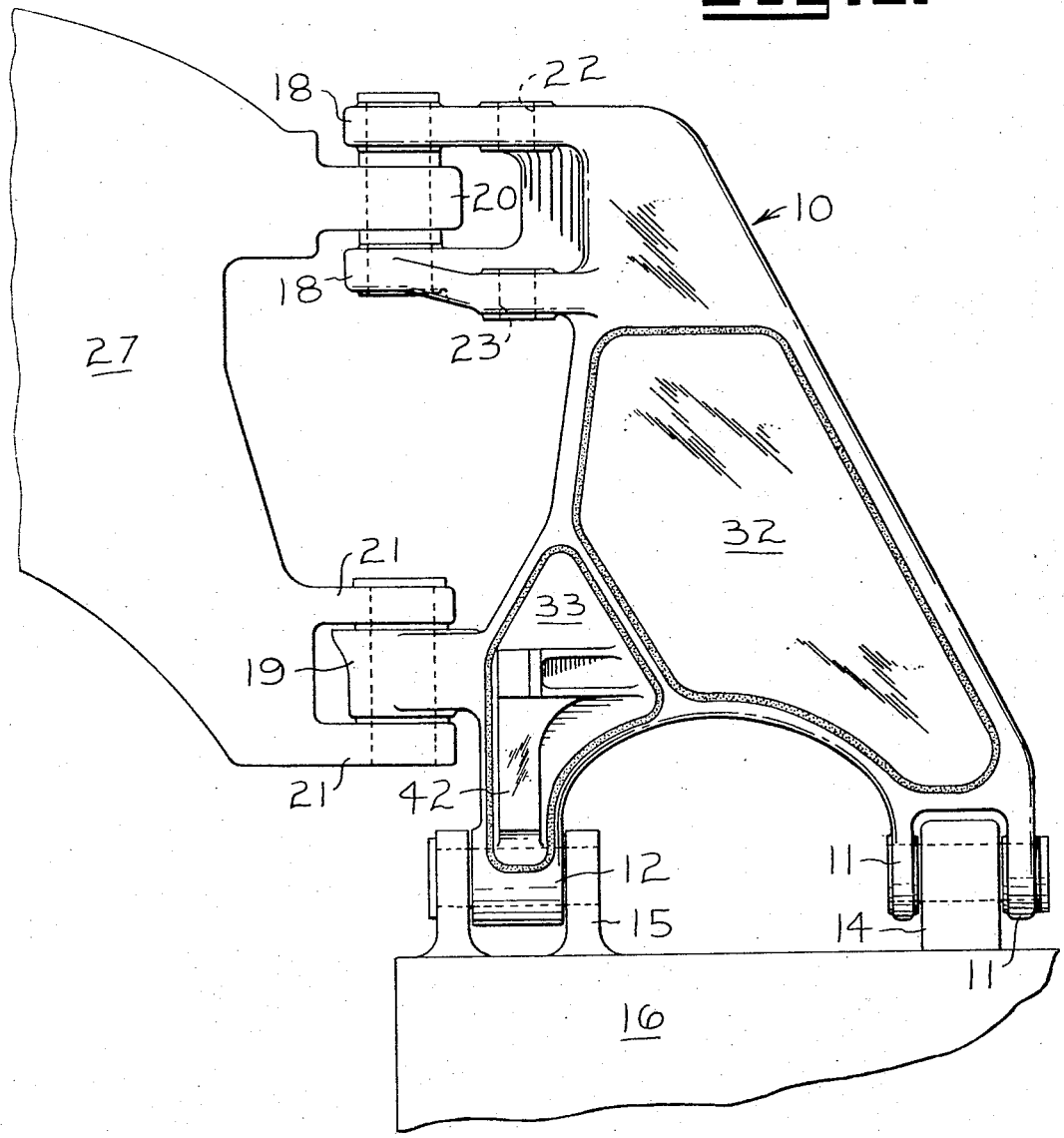
FIG. 1 is a view in side elevation of a tractor-trailer hitch embodying the present invention illustrating a small portion of the tractor and the trailer or scraper.
Figure 2:
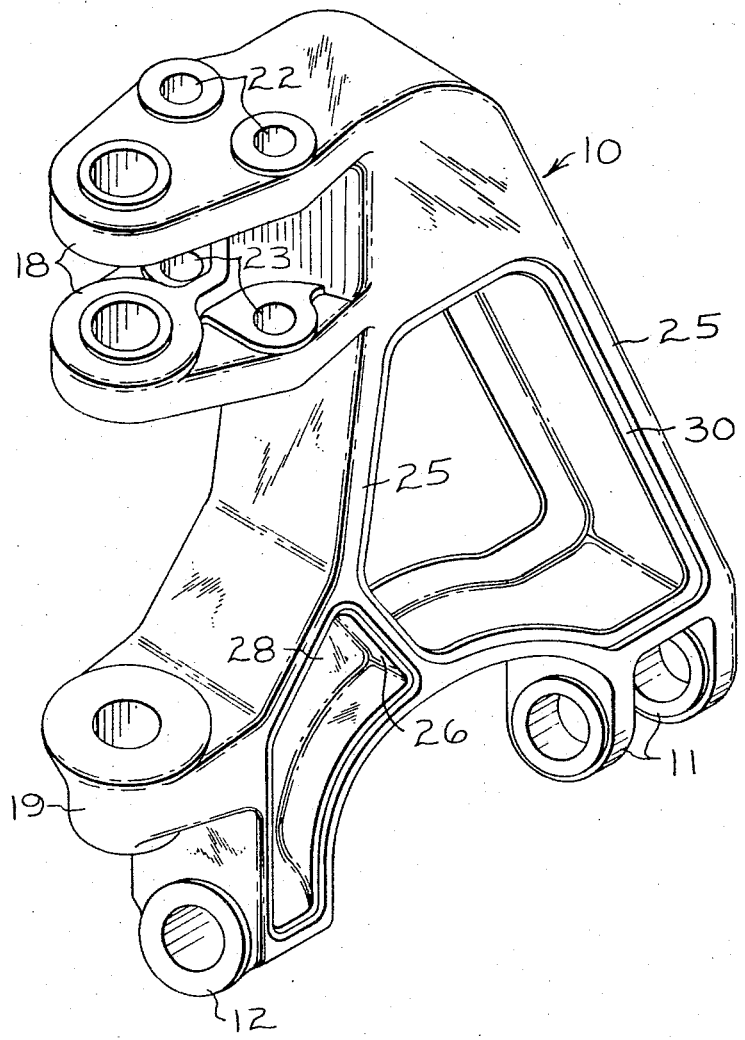
FIG. 2 is a perspective view of the principal component of the hitch shown in FIG. 1.

Referring first to FIGS. 1 and 2, the hitch of the present invention is shown as comprising a triangularly shaped hollow body member generally indicated at 10. The member 10 has downwardly extending hinge lugs 11 and 12 cooperating with mating lugs 14 and 15 to form a hinged connection with the rear portion of a tractor, a part of which is shown at 16. Extending rearwardly of the member 10 are hinge lugs 18 and 19 cooperating with mating lugs 20 and 21 on the forward end or gooseneck 27 of a scraper to form a vertically disposed pivotal connection therewith. The tractor and scraper are not fully disclosed herein as such disclosure is deemed unnecessary to an understanding of this invention but such a combination of implements is illustrated in FIG. 1 of the patent to Hein and Junck, No. 3,181,431. Located in the upper hinge lugs 18 are pairs of aligned bores 22 and 23 for reception of pins which pivotally connect with hydraulic steering mechanisms (not shown) employed for imparting steering movement to the tractor and scraper.

The main portion 10 is formed as a generally triangularly shaped box with large openings in both its side walls which produces flange-like elements as shown at 25 in FIG. 2 extending inwardly and giving a rigid channel-shaped cross section to the perimeter walls of the triangle. A transversely extending wall 26 separates the casting into two hollow compartments, the lower-most of which is again divided into two compartments by a longitudinally extending wall 28. All of the openings in the side walls of the member 10 are provided with circumscribing recessed flanges such as best shown at 30 in FIG. 2 which support closure plates 32 and 33 shown in FIG. 1. These closure plates are all welded into place completely enclosing the space within the main triangularly-shaped component.

Figure 3:
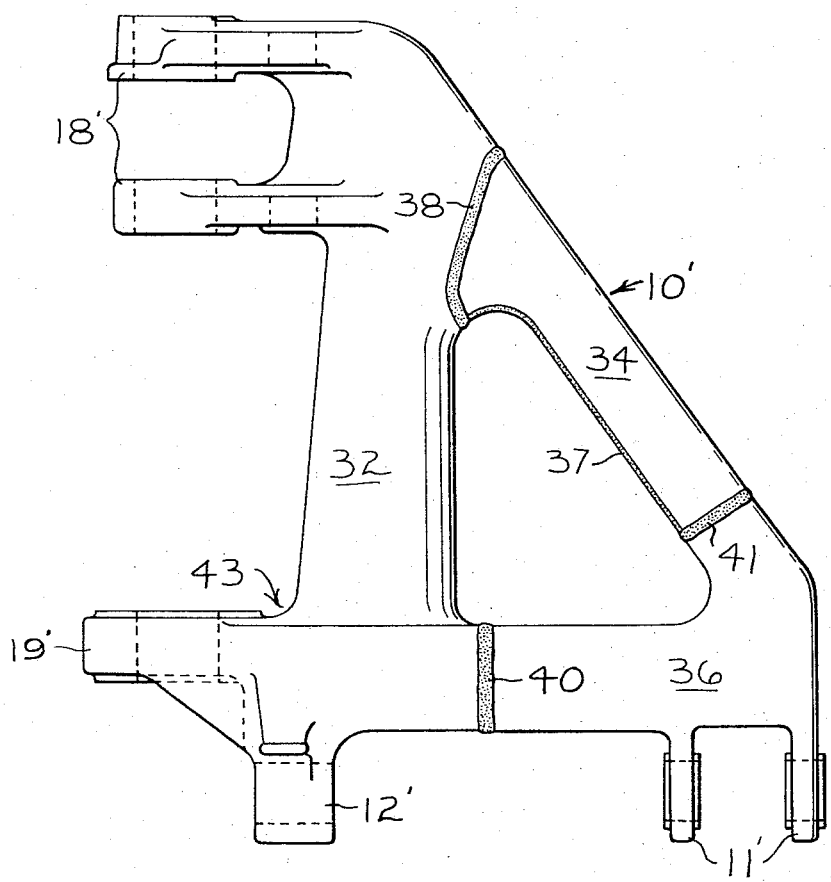
FIG. 3 is a view in side elevation of a previously used hitch over which the present hitch is an improvement.

The many advantages of the device disclosed in FIGS. 1 and 2 can be best appreciated by reference to a previously used hitch element which is shown in FIG. 3. In this figure the element indicated at 10' has hinge lugs 11', 12', 18' and 19' corresponding to the lugs shown in the other views and is functionally the same throughout. However, the triangularly-shaped component is made up of three elements 32, 34 and 36, each of tubular cross section and all welded together. The elements 32 and 36 are made of cast steel and the element 34 is a fabricated member with three walls formed by bending a piece of sheet steel and the fourth inner wall 37 being welded thereto. Disadvantages of this construction which are overcome by the present invention are numerous and have a great deal to do with the arrangement and configuration of the welds which secure the various elements in place.

The hitch member of FIGS. 1 and 2 is made as a single steel casting continuous throughout its heavy load sustaining circumference and with only side plates welded to it. Each of the several welds in this device may be made continuously without stopping since they are disposed in a single plane as contrasted to the welds shown, for example at 38, 40 and 41 in FIG. 3, which are disposed on four planes and must be made in four different operations which increases the possibility of flaws and inclusion of foreign material in the welds. In the improved device, the welds are parallel to the major bending stresses and spaced away from extreme surfaces which are subjected to the greatest stresses. The one-piece casting of the major portion of the structure of FIGS. 1 and 2 permits simplified coring and is of an open design which lends itself to easy inspection. Its cast flanges, which need to be relatively thick due to casting technique and high bending loads due to pull forces, make the hitch efficient in bending. The larger openings in the casting of FIG. 1 are closed by the plates 32 which are of sheet steel and the smaller openings are closed by the plates 33 which are steel castings and have stop members 42 cast integrally with them. Enclosing the hitch with plates makes the hitch a very efficient member to carry twisting loads. Stop members 42 of FIG. 1 serve in limiting the turning movement of the tractor and scraper but are not described in detail here since they do not form a part of the present invention. The web shown at 28 in FIG. 2 provides rigidity and prevents fatigue cracks which frequently occur in the old structure at the area indicated by the arrow 43 in FIG. 3. Actual tests with full-size hitches have shown that more than a 10% saving in steel is obtained without loss of strength and failures have been reduced to a minimum.

I claim:

1. A tractor-trailer hitch comprising a horizontal, longitudinal, pivotal connection for a tractor, a vertical pivotal connection for a trailer a one piece casting extending between said connections, said casting having a peripheral wall and two side walls and having openings in its sides, and flat plates welded in place to substantially completely close said opening and form a box-like structure between said pivotal connections.

2. The combination of claim 1 in which the side wall openings are spaced at all points from the peripheral wall so that a cross section through the peripheral wall is of channel shaped configuration.

3. The combination of claim 2 in which the side walls are formed each in a substantially single plane.

4. The combination of claim 3 in which the axes of the two pivotal connections are in one plane which is disposed between the planes of the side walls.

References Cited
UNITED STATES PATENTS

| | | | |
|---|---|---|---|
| 1,353,094 | 9/1920 | Trumpour | 280—494 |
| 2,884,083 | 4/1959 | McColl | 280—492 X |
| 3,134,628 | 5/1964 | Lackey | 280—433 X |

LEO FRIAGLIA, *Primary Examiner.*